United States Patent
Maeda

[11] 3,788,596
[45] Jan. 29, 1974

[54] VALVE FOR ABRUPTLY RELIEVING FLUID UNDER PRESSURE

[75] Inventor: Riichi Maeda, Yokohama, Japan

[73] Assignee: Nissan Motor Company, Limited, Yokohama, Japan

[22] Filed: Apr. 26, 1971

[21] Appl. No.: 137,357

[30] Foreign Application Priority Data
Apr. 30, 1970 Japan.............................. 45-41413

[52] U.S. Cl............. 251/69, 280/150 AB, 141/313, 74/520, 74/2
[51] Int. Cl........................................... F16k 35/16
[58] Field of Search......... 251/280, 279, 66, 69, 68; 280/150 AB; 74/2, 520; 244/118 P

[56] References Cited
UNITED STATES PATENTS

| | | | |
|---|---|---|---|
| 3,095,901 | 7/1963 | Larson et al.................... | 251/280 X |
| 1,369,137 | 2/1921 | Simmons......................... | 251/280 X |
| 2,365,927 | 12/1944 | Allen ................................ | 251/280 |
| 2,469,831 | 5/1949 | Lewis................................ | 251/69 X |
| 2,834,609 | 5/1958 | Bertrand........................ | 280/150 AB |
| 3,182,951 | 5/1965 | Spencer.......................... | 251/280 X |
| 3,414,292 | 12/1968 | Oldberg et al................ | 280/150 AB |

*Primary Examiner*—Henry T. Klinksiek
*Attorney, Agent, or Firm*—Robert E. Burns; Emmanuel J. Lobato

[57] ABSTRACT

A valve operable to abruptly allow a fluid under pressure to flow for example to inflate safety means in an automobile comprises a housing having a valve seat, a movable valve member seatable on the valve seat and a linkage mechanism controlling movement of the valve member. The linkage mechanism comprises first and second links constituting a toggle. The first link is pivotally connected at one end to the valve member and at the opposite end to one end of the second link the opposite end of which is pivotally connected to the housing. When the valve member is seated to close the valve the axes of the first and second links make a minor angle with one another so as to resolve the force applied to the valve member by the pressure fluid into a major component force approximately in line with the links to hold the valve member seated and a minor component force approximately normal to the axes of the first and second links and acting in a direction to unseat the valve member. In order to open the valve the linkage is movable to a second position in which the axes of the first and second links make a major angle with one another. Electromagnetic means is provided for holding the linkage in the first mentioned position against the minor component force to maintain the valve closed and for releasing the linkage to allow it to be moved to the second mentioned position by the minor component force and thereby open the valve. An extension on the valve member is pivotally connected to a portion of the housing to provide for pivotal movement of the valve member between open and closed position.

10 Claims, 3 Drawing Figures

VALVE FOR ABRUPTLY RELIEVING FLUID UNDER PRESSURE

This invention relates to a valve for abruptly relieving a fluid under pressure, and, more particularly, to a valve for use in a vehicular safety system of a type providing an inflated bag for protecting a vehicle occupant from injury in the event of a collision.

There has been proposed a method of providing an inflated shock-absorbing bag between a vehicle occupant and structural parts of the vehicle in order to protect the occupant from injury in a collision. In this method, an inflatable bag, which is usually held in a deflated condition, is inflated at an initial stage of the collision by abruptly inhaling a suitable working fluid in response to a collision. The working fluid is confined in a liquid phase under pressure in a container. A typical method in this instance employs chemical explosives, by which a seal in the container is ruptured so that instantaneous communication between the container and the deflated bag is established when a collision occurs.

However, the use of explosives inevitably invites operational problems. Due to the aging of the explosive charge, sufficient reliability can not always be expected. Moreover, even if an explosion of the explosives takes place at the initial stage of a collision, it is not absolutely certain whether the explosion will provide such an opening or passage that a sufficient amount of working fluid necessary to properly inflate the deflated bag is discharged in a required short period of time. Another problem attendant with the use of explosives is that the blast resulting from explosion produces an ear-deafening sound which will heavily shock the vehicle occupant. Once the explosion has occured, on the other hand, it is difficult to recharge the explosives for a subsequent use.

It is, therefore, an object of this invention to provide a valve using a toggle link mechanism for abruptly relieving a working fluid under pressure.

It is another object of the invention to provide a valve for use in a vehicular safety system with sufficient reliability, relatively quiet in operation and capable of repetitive use.

Still another object is to provide a vehicular safety system using a valve of the above outlined character for protecting a vehicle occupant from injury during collision.

Figure 1:
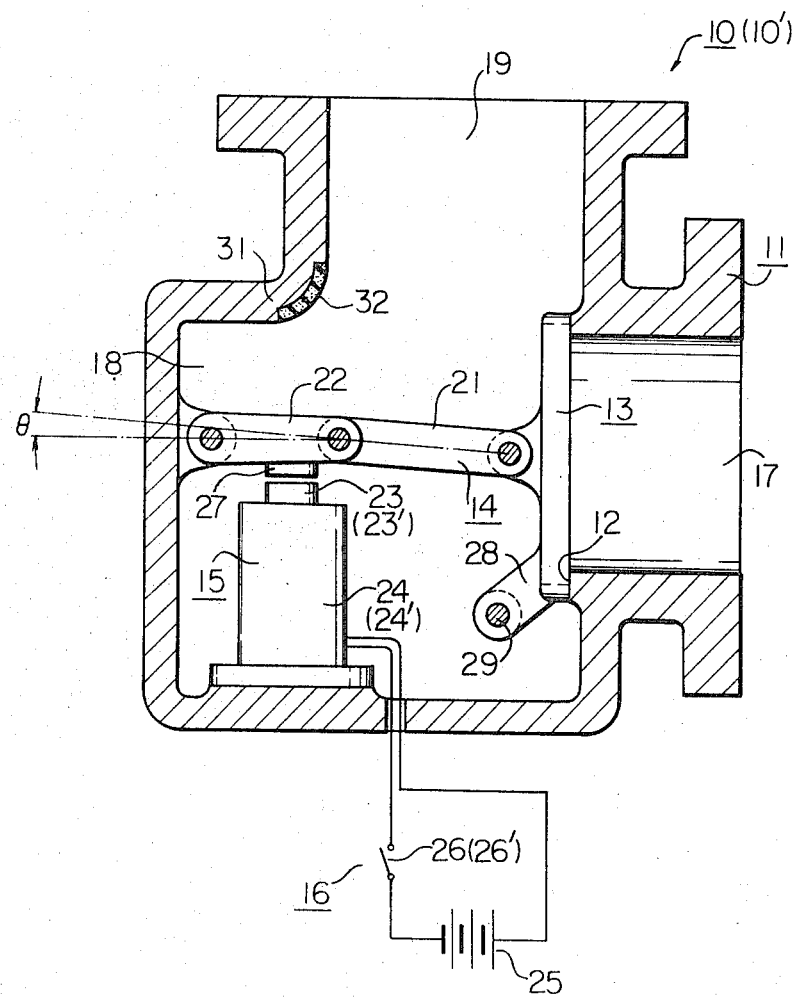
FIG. 1 is a sectional side elevation view illustrating a valve, according to this invention, in a closed position.
Figure 2:
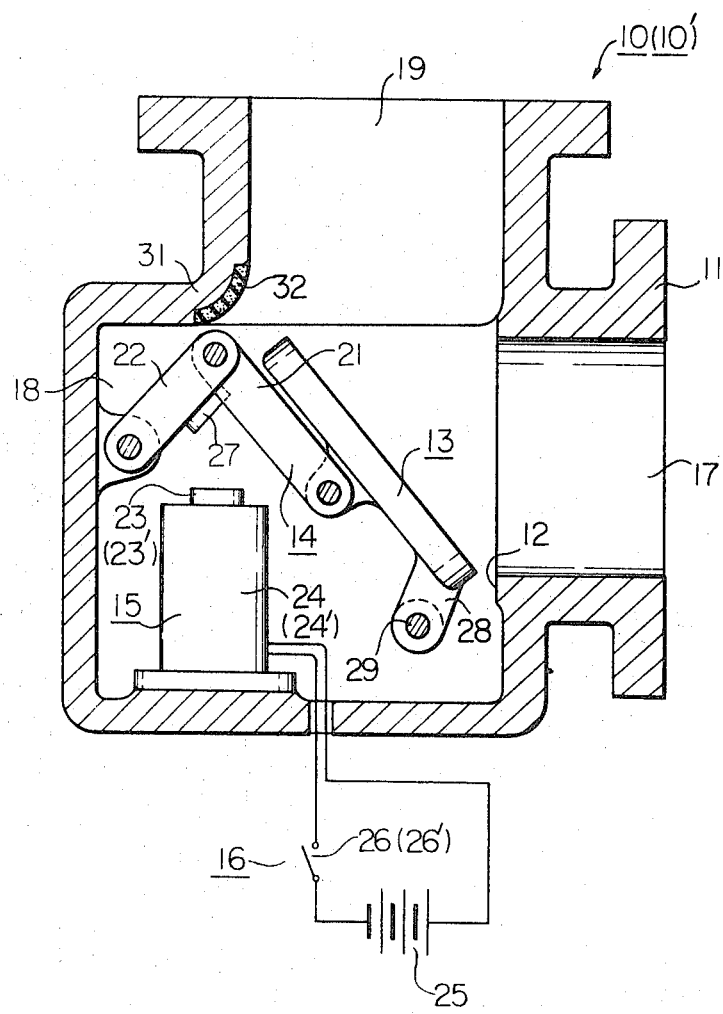
FIG. 2 is a sectional side elevation view illustrating the valve of FIG. 1 in an open position.

Referring now to FIGS. 1 and 2, a valve 10 according to this invention comprises a housing 11 having a valve seat 12 therein, a valve member 13 seatable on the valve seat 12, a link mechanism 14 pivotally connected to both the housing 11 and the valve member 13, first means 15 effective to hold the link mechanism 14 in an extended position for keeping the valve member 13 seated in a closed position to close the valve 10, and second means 16 for rendering the first means 15 ineffective to allow the valve member 13 to be moved to an opened position to open the valve 10. The housing 11 is provided with an inlet 17 which has communication with a container, not shown, confining a working fluid under pressure. The working fluid may be liquefied gases such as Freon (R.T.M.). The valve seat 12 is located on the inner periphery of the inlet 17. The valve member 13 is therefore biased in its seated or closed position to the unseated or opened position to be unseated from the valve seat 12 by a pressure force due to pressure in the working fluid. As shown, the housing 11 defines a chamber 18 accommodating the valve member 13, the link mechanism 14, the first means 15 and, if necessary, the second means 16, and is provided with an outlet 19 communicating with an atmosphere or a usually deflated bag, not shown, as the case may be.

The link mechanism 14 is of the so-called toggle type and includes a plurality of links pivotally connected to each other. First and second links 21 and 22 constituting toggle linkage are pivotally connected to the valve member 13 and the housing 11, respectively and assume an extended position when the valve member 13 is in its seated position. In their extended position, the axes the links 21 and 22 make a minor angle 0 so that the biasing pressure force applied to the valve member 13 by the fluid is resolved into a minor component force approximately normal to the axes of the links 21 and 22. Although the link mechanism 14 is so biased by the pressure force, as to be retracted from the valve seat 12, the valve member 13 can be kept in its seated position by attracting the links 21 and 22 by an equal minor force against the minor component force in a direction approximately normal to the axes of the links 21 and 22. Thus, the attractive force to be supplied by the first means 15 can be preset at a low level even if the biasing pressure force is at a high level.

The first means 15 is shown of electromagnetic type in FIGS. 1 and 2, entirely by way of example. The first means 15, if it is of electromagnetic type, is disposed in the chamber 18 in the neighbourhood of one of the links 21 and 22. In this instance, the first means 15 includes a magnetic core 23 mounted sideways of the link 22 on the housing 11, and a solenoid coil 24 mounted around the magnetic core 23 for keeping the same magnetized while energized. Energization of the solenoid coil 24 is carried out by a suitable energy source 25 electrically connected thereto. Between the connection of the solenoid coil 24 with the energy source 25 is provided as the second means 16 a switch 26 which is usually closed. When it is intended to open the valve 10 of the invention, therefore, the switch 26 is opened manually or automatically upon detection of some condition so as to de-energize the solenoid coil 24. In order to be electromagnetically attracted by the first means 15, the link 22 is provided with a magnetic member 27 fixedly mounted thereon or a substantial portion thereof made of a magnetic material.

As shown in FIGS. 1 and 2, on the other hand, the valve member 13 is provided with an extension 28 pivotally connected to the housing 11 through a pivot 29. This pivot 29 is disposed at such a position that, when the link mechanism 14 is fully retracted from the valve seat 12, the valve member 13 may be oblique to the valve seat 12. This oblique position of the valve member 13 is effective for guiding the working fluid in a predetermined direction, for instance, toward the outlet 19, when the fluid is relieved through the inlet 17 into the chamber 18 with the valve member 13 fully unseated. In this instance, a portion 31 of the housing 11 is so shaped as to provide an abutment for the link mechanism 14 when the link mechanism 14 is fully retracted, as shown in FIG. 2. The abutment portion 31 may preferably be provided with a resilient member 32 for absorbing mechanical shocks resulting from abutment of the link mechanism 14 with the abutment portion 31.

In a more preferable embodiment, the attracting means 15 includes a permanent magnet core 23' whose position may be the same as that of the magnetic core 23 of the former embodiment. With use of the permanent magnet core 23', the first means 15 continues attracting the link mechanism 14 so as to keep the valve member 13 in its seated position. Thus, the second means 16 of this embodiment includes a solenoid coil 24' mounted around the permanent magnet core 23' for demagnetizing the same when energized, and a switch 26' for connecting the solenoid coil 24' with an energy source 25 when it is intended to open the valve 10' exemplified in this embodiment. This embodiment will provide a more useful valve, because it is needless to continuously energize the first means 15 so as to keep the valve 10' closed. This affords increased reliability because there is less possibility of the valve accidentally being opened.

In either embodiment, it should be appreciated as an important feature of the invention that the valve member 13 can be kept seated by applying a limited amount of attractive force with sufficient reliability. Another important feature is that large movement of the valve member 13 due to retraction of the link mechanism 14 provides a passage through which a sufficient amount of the working fluid is discharged in a short period of time, as understood from FIG. 2.

Figure 3:
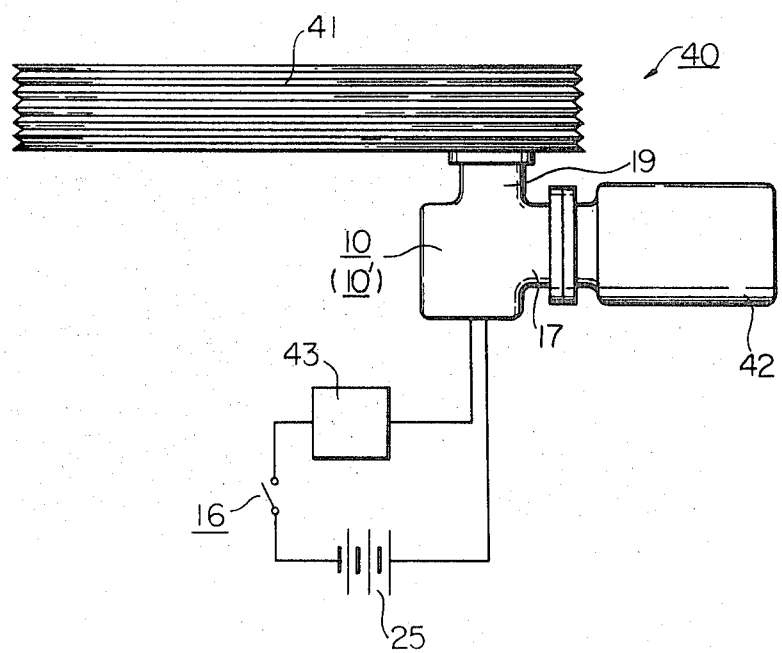
FIG. 3 is a schematic view of a vehicular safety system using a valve of the type shown in FIGS. 1 and 2.

Turning to FIG. 3 there is illustrated a vehicular safety system 40 employing a valve of the type shown in FIGS. 1 and 2. The vehicular safety system 40 comprises an inflatable and usually deflated bag 41, a container 42 confining a working fluid under pressure, sensing means 43 for sensing an impact due to a collision of a vehicle, not shown, and a valve 10 or 10' of the invention. The inflatable bag 41 and the container 42 are hermetically connected respectively with the outlet 19 and the inlet 17 of the valve 10 or 10'. The sensing means 43 may be of any type if it is cooperative with the second means 16.

When, in operation, the sensing means 43 senses the impact, the first means 15 is rendered ineffective, as has been discussed with reference to FIGS. 1 and 2, so that it stops attracting the link mechanism 14 in a direction approximately normal to the axes of the links 21 and 22. At this particular instance, the minor component force becomes effective to retract the link mechanism 14 from its extended position. Concurrently, the valve member 13 is abruptly unseated from the valve seat 12 and is then rapidly moved to a position allowing the working fluid to rush into the inflatable bag 41 from the container 42. Thus, an inflated bag is provided between a vehicle occupant and structural parts of the vehicle for protecting the occupant from injury.

The safety system of the invention can be used repeatedly by changing the container to a new one. Different from the conventional safety system using explosives, the present safety system can considerably alleviate the sound produced during operation.

What is claimed is:

1. A valve operable to abruptly allow a fluid under pressure to flow, comprising a housing having an inlet and an outlet, means connecting said inlet with a source of fluid under pressure, a valve seat surrounding said inlet, a valve member pivotally mounted in said housing for movement between an open position and a closed position in which it is seated on said valve seat and is subjected to said fluid under pressure which exerts a force on said valve member in a direction to move it to open position, a link mechanism comprising a first link pivotally connected at one end to said valve member and a second link having one end pivotally connected to the opposite end of said first link and having the opposite end pivotally connected to a portion of said housing generally opposite said valve seat for free pivotal movement, one of said links having a ferromagnetic portion near the pivotal connection between the links, said first and second links constituting a toggle linkage movable between a first position, when said valve member is seated on said seat to close said valve, in which the longitudinal axes of said first and second links are disposed at a minor angle to one another to resolve the force exerted on said valve member by said fluid under pressure into a major component force approximately in line with said links to hold the valve member seated and a minor component force approximately normal to the longitudinal axes of said links and acting in a direction to unseat the valve member and a second position in which the longitudinal axes of said first and second links are disposed at a major angle to one another and the valve member is in open position, magnet means in said housing in position to attract said ferromagnetic portion to hold said first and second links in said first position against said minor component force, and means for rendering said magnet means ineffective and thereby permitting said first and second links to be moved to said second position by said minor component force to open said valve.

2. A valve according to claim 1, in which said valve member has a radial extension pivotally connected to said housing at one side of said valve seat and in which said second link in moving from said first position to said second position swings about its pivotal connection to the housing in the same rotational direction as said valve member in moving from closed to open position.

3. A valve according to claim 1, in which said inlet and outlet are disposed generally at right angles to one another and said pivotal mounting of said valve member in said housing is disposed at such position that said valve member when in open position is oblique to said valve seat to guide said fluid from the inlet to the outlet of said housing.

4. A valve according to claim 1, in which said housing is provided with a portion shaped and located to provide an abutment engageable by said link mechanism when said valve member is in open position and siad first and second links are in said second position to thereby limit movement of said link mechanism and said valve member.

5. A valve according to claim 4, in which said portion engageable by said link mechanism is of shock absorbing material.

6. A valve according to claim 1, in which said magnet means comprises a magnetic core and a solenoid coil surrounding said magnetic core for magnetizing said magnetic core when energized, and in which said means for rendering said magnet means ineffective includes switch means for controlling deenergizing of said solenoid coil.

7. A valve according to claim 1, in which one of said links has a substantial portion formed of a magnetic material in position to be attracted by said magnet means.

8. A valve according to claim 1, in which a magnetic member is fixedly mounted on one of said links in position to be attracted by said magnet means.

9. A valve operable to abruptly allow a fluid under pressure to flow, comprising a housing having a valve seat therein, a valve member movable in said housing between an open position and a closed position in which it is seated on said valve seat and is subjected to said fluid under pressure which exerts a force on said valve member in a direction to move it to open position, a link mechanism comprising a first link pivotally connected at one end to said valve member and a second link having one end pivotally connected to the opposite end of said first link and having the opposite end pivotally connected to a portion of said housing generally opposite said valve seat, one of said links having a ferromagnetic portion near the pivotal connection between the links, said first and second links constituting a toggle linkage movable between a first position when said valve member is seated on said seat to close the valve, in which the longitudinal axes of said first and second links are disposed at a minor angle to one another to resolve the force exerted on said valve member by said fluid under pressure into a major component force approximately in line with said links to hold the valve member seated and a minor component force approximately normal to the longitudinal axes of said links and acting in a direction to unseat the valve member and a second position in which the longitudinal axes of said first and second links are disposed at a major angle to one another and the valve member in in open position, permanent magnet means in said housing in position to attract said ferromagnetic portion to hold said first and second links in said first position against said minor component force, electromagnetic means in position to counteract said permanent magnet means when said electromagnet means is energized to thereby render said permanent magnet means ineffective and permit said first and second links to be moved to said second position by said minor component force to open said valve, and electric circuit means controlling the energization of said electromagnet means.

10. A valve according to claim 9, in which said electromagnet means comprises a coil and said permanent magnet means comprises a permanently magnetized core of said coil.

* * * * *